United States Patent Office 3,434,621
Patented Mar. 25, 1969

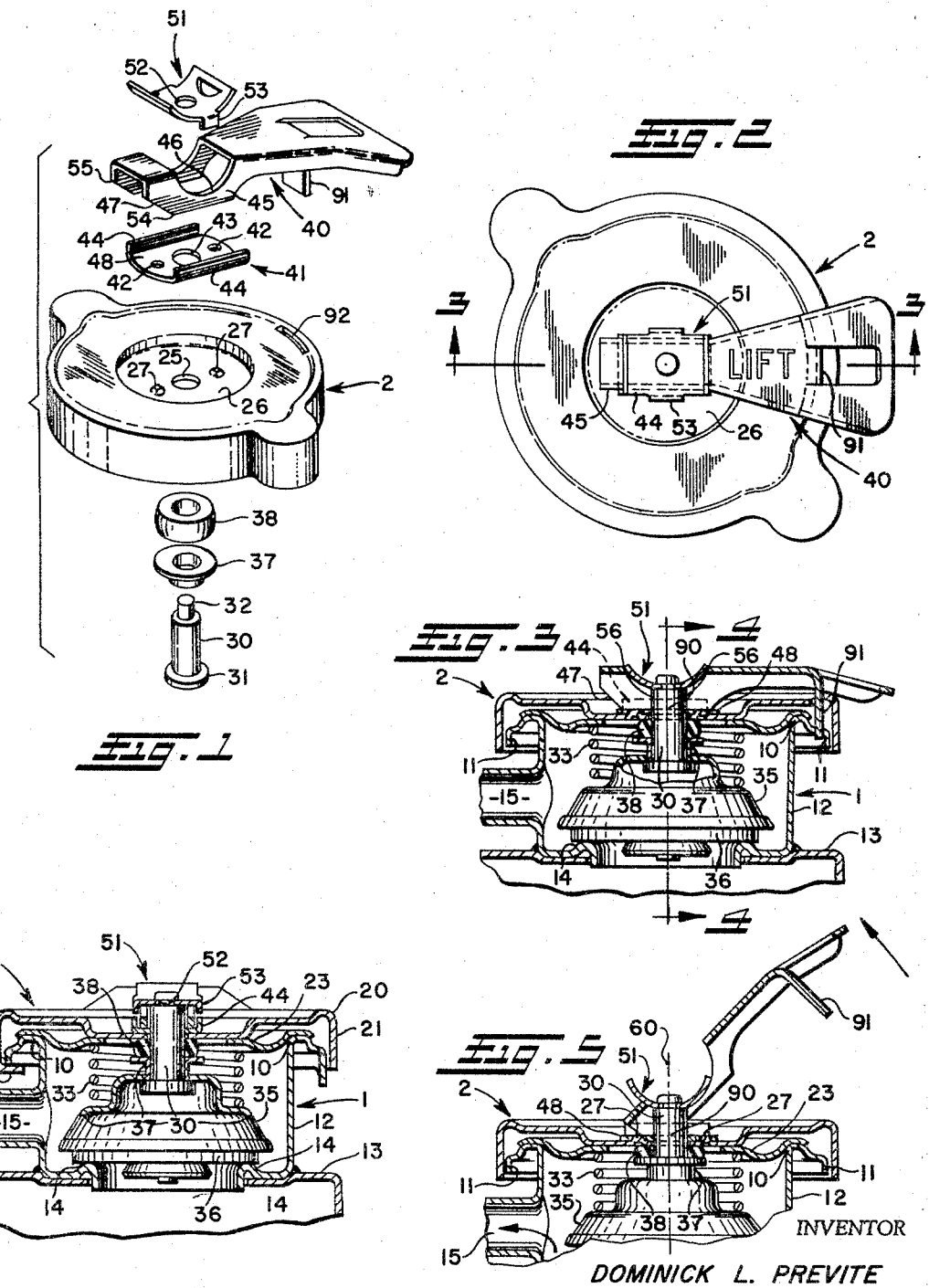

3,434,621
SAFETY PRESSURE CAP
Dominick L. Previte, Willowick, Ohio, assignor to Eaton Yale & Towne Inc., Cleveland, Ohio, a corporation of Ohio
Filed Aug. 23, 1966, Ser. No. 574,457
Int. Cl. B65d 51/16
U.S. Cl. 220—44                                        15 Claims

ABSTRACT OF THE DISCLOSURE

Safety pressure cap for automobile radiators including a pressure release lift handle of limited upward movement to prevent hood damage, and incorporating unique lift handle retention and alignment structure which maintains the handle locking means firmly in position, free of undesirable rattles and vibrations.

---

The present invention relates to a safety pressure cap for automobile radiators and is particularly concerned with an improved means for safely releasing pressure within the cooling system. The primary function of such a cap is to seal the radiator filler neck and thereby close an engine cooling system which is customarily pressurized for increased cooling efficiency. Pressures have increased in engine cooling systems in recent years and it is conventional to provide a pressure cap which automatically relieves any excess pressure through a vent by means of a relief valve built into the cap and admits air preventing collapse of any part of the system when the cooling pressure system falls too low by means of a vacuum operated valve within the cap.

When the engine has been in operation for an appreciable period and the cooling system is pressurized, there is an inherent danger of someone removing the cap from the filler neck which causes a sudden release in pressure and increase in boiling of the engine coolant. The result is that the person removing the cap is often drenched and scalded with the resulting steam and water which issues from the filler neck.

There have been many design attempts to combat the above described drenching and scalding of a person upon removal of the automobile radiator pressure cap including providing an intermediate dwell position on the cooperating cap and filler neck which is intended to inhibit premature removal of the cap before desired venting of the pressurized cooling system. However, provision of such an intermediate dwell position has not seen an end to the undesired drenching and scalding accidents because such dwell positions can be easily overcome and in fact do not preclude rapid, premature removal of the radiator cap.

Another design attempt which has proved successful in combating the undesired quick removal of radiator caps is in the use of a handle locking means which precludes any turning movement of the cap until the handle locking means is lifted or released which brings about a venting of the cooling system to relieve the excess pressure within the system. Such a safety pressure cap is the subject of my earlier patents entitled "Closure Device," No. 3,186,580 issued June 1, 1965, and No. 3,203,578 issued Aug. 31, 1965.

The handle locking means type of safety pressure caps of my earlier patents and the other available prior art designs were not completely satisfactory, however, since they were of relative complicated and involved structure, were expensive to manufatcure, not adaptable to mass production requirements, and required an undesired high lifting movement of the handle relative its associated cap. The requisite relative high lifting movement of the handle of the prior art designs is undesirable because if the individual negligently leaves the handle in its pressure relief position and closes the automobile hood, damage will occur to the handle, cap, hood, filler neck or radiator.

The present invention is an improvement over my earlier patents and other available patents and related pressure cap designs because of my unique retention and alignment structure which limits the pressure relief uplifting of the handle release means to a predetermined height relative its associated cap.

In accordance with the above, the primary object of the present invention is to provide a combined closure and valve means for closing the end of a filler neck connected to a pressure container while automatically releasing any excess pressure within the container and admitting air when the pressure within the container falls below a predetermined value.

Another primary object of the present invention is to provide a combined closure and valve means as described in the next preceding paragraph wherein means are provided for effectively relieving the pressure within the container before permitting opening movement of the closure from the filler neck.

Another primary object of the present invention is to provide a safety pressure cap having locking means precluding rotational opening movement of the cap before said locking means is released which will effect a venting of the internal pressure within the system closed by said cap.

It is a further object of the present invention to provide a safety pressure cap for closing a cooling system having handle means which cooperatively engages a portion of said cap and its associated filler neck to prevent rotational opening movement of said cap until said handle is lifted or rotated to a position away from said cap, the handle in its locked or retaining position being compact and always in close proximity to said cap.

Another object of the present invention is to provide a safety pressure cap as described in the next preceding paragraph wherein the handle means is limited to a predetermined lifting or rotational movement relative the cap member.

Another important object of the present invention is in providing an improved safety pressure cap of an inexpensive, uncomplicated design readily adaptable to mass assembly techniques and which is adaptable to any of the common automobile cooling system filler necks presently on the market.

Another important object of the present invention is to provide a safety pressure cap having a handle locking means for precluding rotational movement of the cap in its lowermost operating position and releasing the cap in its uplifted pressure relief position, with unique retention and alignment structure which maintains the handle locking mean firmly in position, free of undesired rattles and vibrations.

The above and further objects of the present invention will become apparent from the following specification and particularly as pointed out in the appended claims.

To the accomplishment of the above and related objects, my invention may be as the embodied form illustrated in the accompanying drawings with the understanding that the drawings are illustrative only and that change may be made in the specific construction illustrated and detailed so long as within the scope of the appended claims.

FIGURE 1 is an exploded isometric view showing the main parts of the present invention.

FIGURE 2 is a plan view of a pressure cap of the present invention.

FIGURE 3 is a vertical sectional view of the pressure cap of the present invention.

FIGURE 4 is a vertical sectional view taken on the line 4—4 of FIGURE 3.

FIGURE 5 is a vertical sectional view corresponding to FIGURE 3 showing the handle member in its uplifted or pressure release position.

Referring to the drawings, it will be seen that I have illustrated my unique pressure safety cap in use with a conventional filler neck generally indicated as 1 and formed to provide an upper or diaphragm seat 10, a peripheral lip 11 with cam lower edges, and extension 12 secured to a conventional radiator tank 13 and a valve seat 14. The filler neck 1 also is provided with an overflow vent 15 with which is connected an overflow conduit (not shown), the vent being positioned between the seats 14 and 10.

The cover or cap member, generally indicated as 2, has a conventional cup shape 20 having a downturned outer flange 21 and inturned tangs 22. The cover member tangs 22 cooperatively engage the cam surfaces of peripheral lip 11 of the filler neck member 1. The safety pressure cap 2 has a diaphragm member 23 for engagement with the upper seat 10 of the filler neck. Extending through a central opening 25 of the cover member 2 is a post or pin member 30 which has a lower flange portion 31 for engaging the underside of a hollow bell shaped member 35. The bell shaped member 35 has a lower valve portion 36 for cooperating, sealing engagement with the filler neck lower valve seat 14. The bell shaped member 35 also includes a vacuum relief valve arrangement (not shown) for admitting air when the pressure within the tank 13 falls below a predetermined value. The details of the vacuum relief valve arrangement which would be utilized in my safety pressure cap would be as illustrated and described in my before-mentioned Patent No. 3,186,580. A conventional coil spring 33 acting against the underside of the cover member 2 through the diaphragm tends to maintain the valve portion 36 of the bell shaped member 35 against the filler neck valve seat 14. Surrounding the post member 30 and engaging at its lower end the flange 31 of the post member is a grommet 37. The grommet 37 receives the lower edge of a seal member 38 which is positioned between the underside of the cover member and the grommet 37. The seal member 38 is preloaded or distorted when assembled for purposes to be hereinafter described.

So far the above described details of my safety pressure cap are conventional and novelty of my cap is not based on such features. The uniqueness of my safety pressure cap is found in the retention and alignment structure of the pressure relief handle to be now described.

Cover member 2 has a depressed central portion 26 for receiving a front portion of a handle member generally indicated as 40. Within the central depressed portion of the cover member are two identical raised portions 27 which have a generally cylindrical configuration. A wear plate guide member generally indicated as 41 has punched-out openings 42 for receiving the raised portions 27 of the pressure cap when the wear plate guide member 41 is placed into the central area 26 of the cover member. Wear plate guide member 41 also has a central opening 43 corresponding with the opening 25 of the cover member 2. The wear plate guide member 41 has its lateral edges 44 upturned to receive therebetween the lateral sides 45 of the handle member 40. As clearly seen in the plan view of FIGURE 2, the lateral sides 45 of the handle member 40 are precluded from lateral movement because of their engagement with the upturned portions 44 of the wear plate guide member 41 and thus, the wear plate guide member defines the plane of rotational movement of the handle member.

The handle member 40 has a concave or an arcuate portion 46 as clearly seen in FIGURE 1. Shaped to correspond to the concave portion 46 to be received therein is a spring retainer member generally indicated as 51.

The spring retainer member 51 is a leaf type spring made of conventional spring steel and has a central opening 52 corresponding to the beforementioned central openings 42 and 25 of the wear plate guide member 41 and the cover member 2, respectively. The spring retainer member has downturned tabs 53 for engagement with the lateral sides 45 of the handle member 40.

As can be best seen in FIGURES 3–5, the wear plate guide member 41 is mounted within the centrally depressed portion 26 of the cover member 2 about the post member 30 with the raised portions 27 within the openings 42 for maintaining the wear plate guide member 41 in place. Then the handle member 40 is placed so that its side portions 45 are in engagement with the upturned lateral portions 44 of member 41 and spring retainer member 51 is placed on the rivet portion 32 of the post member 30. The rivet member 32 is then bent over or flattened to maintain the spring retainer member 51 in place.

In its normal lowermost operating position, as illustrated in FIGURES 3 and 4, the handle member 40 is engaged at point contacts 56 by the spring retainer member 51. Because of its inherent resilient nature, the spring retainer member 51 tends to lift the post member 30 upwardly because the spring retainer member 51 is tending to flatten out to a horizontal plane through points 56. However, the post member 30 is restrained from upward movement because of the additive forces of the preloaded seal member 38 acting on the grommet member 37 and spring 33 acting on bell shaped member 35 against the post member lower flange 31 in a downwardly direction. Thus, the resilient force of the spring retainer member 51 is effected against the handle member 40 to maintain the handle member in a firm or solid condition in its lowermost operating position so that the handle member is not permitted to rattle or vibrate under normal conditions.

As will be appreciated by those skilled in the art, the critical feature of safety pressure cap devices utilizing pressure relief handles, as in the instant invention, is the amount of uplifting pivotal movement required of the handle member to effect a pressure release opening of the valve member 36 away from the cooperating seat member 14, and a retention of the handle in its uplifted position when released by the individual. In the past, such handle type pressure relief safety pressure cap devices have needed a lifting of the handle to a vertical or near vertical position which encompassed a near 90° pivotal movement of the handle member relative the cover member. After the handle was lifted and left in its near vertical position the individual would often forget to lower the handle and would damage the hood, filler neck, the cap including its handle and even the radiator of the automobile upon closing the hood. My safety pressure cap device necessitates the lifting or pivotal movement of the handle of only approximately 40° relative its cover member. It is to be understood that a safety pressure cap using my retention and alignment arrangement could be effective with a requisite lifting or pivotal movement of the handle of less than the approximate optimum 40° relative its cover member depending on particular design desires and requirements. The approximate 40° movement of the handle relative its associated cover has been found to be optimum because in its uplifted position the handle would be adequately, visibly spaced from the cover member, calling the attention of the individual to the uplifted position of the handle and requiring him to depress the handle to its lowermost operating position to prevent the beforementioned undesired damage upon closing of the hood. Furthermore, if the handle is in its optimum 40° uplifted position relative its associated cover member, the hood, when closed, will inherently cam the handle towards its lowermost operating position. This feature of permitting a minimum elevation or pivotal movement of the handle in the pressure relief position greatly reduces the chances of the beforementioned accidental destruction of the filler neck, handle, the hood or the cap itself upon closure of the hood when the handle is left in its uplifted pressure relief position.

The retention arrangement of the cooperating spring retainer member, the wear plate guide member and the handle member effect the unique action of the instant invention in permitting a minimum elevation of the handle when effecting an uplifting of the valve member to vent any excess pressure within the tank 13. The handle member 40 has a cam surface 47 which engages a wear plate guide member surface 48 when the handle member is pivoted about its points of engagement with the spring retainer member 51. When the handle 40 is uplifted from its lowermost operating position, as illustrated in FIGURES 3 and 4, to its uplifted pressure relief position of FIGURE 5, the force required to lift the handle will cause the spring retainer radius to conform to the shape of the concave or arcuate portion 46 of the hnadle member to essentially coincide therewith. Thus, the deformed spring retainer member 51 acts as a bearing for the handle member during its pivotal movement.

By construction, the handle member engages and pivots about the spring retainer member 51 and thus in fact is pivoting about the imaginary center point 60 of the spring retainer member. As can be appreciated by those skilled in the art, the lowermost edge 54 of the handle member cam surface 47 must be pivoted to a point slightly past the imaginary point of intersection 90 between the surface 48 of the wear plate guide member 41 and the center line of the spring retainer member 51. With the relatively high position of the center of rotation of the handle member as in the instant invention, it is necessary to only lift or rotate the handle member 40 about its imaginary pivot point a relatively small amount before the lowermost edge of the handle cam surface 54 will have gone slightly past the beforementioned point of intersection 90.

As discussed above, it has been found in the applicant's instant invention that a vertical lift of rotational movement of the handle member of only approximately 40° relative the cover member 2 is necessary to effect an opening of the valve member 36 away from valve seat 14 and retention of the handle in its uplifted position. The limit of the uplifted or rotational movement of the handle is determined by the intersection of the upper end 55 of the lever cam surface 47 and the wear plate guide member surface 48.

As in my previous Patent 3,186,580, the instant invention is provided with a locking tab 91 extending from the handle 40 and cooperating grooves in the cover member 2 and the filler neck diaphragm seat portion 10. The cover member slot 92 can clearly be seen in FIGURE 1. As also described in my beforementioned Patent 3,186,580, a stop member is provided on the filler neck to provide for alignment of the corresponding cover member and filler neck slots when the cover member is rotated to its closed position on the filler neck. When the handle member is in its lowermost operating position of FIGURE 3, the cover member 2 can not be rotated until the handle member 40 is uplifted to its pressure relief position of FIGURE 5.

In prior art safety pressure caps having handle locking means, it has been found that during constant opening and closing movement of the handle member, the cover member is scratched and worn by the interengagement of the handle member cam surface and the cover member. In the instant invention, a wear plate guide member 41 having desired physical properties of suitable strength and wear resistance is provided for engagement by the lever member cam surface 47.

As described above, the instant invention is an improved safety pressure cap device in that it offers a simple and compact structure having inexpensive assembly features, a simple spring retainer arrangement which maintains the handle in a firm or solid condition in its lowermost operating position, and which requires but a minimum elevation or pivotal uplifting of the handle to the pressure relief position relative the cover member to effect the pressure relief opening of the filler neck valve member.

Having described my invention, I claim:

1. In a pressure relief closure device,
   a cover member adapted for releasably engaging and closing a pressure outlet line,
   pin means extending through said cover member,
   lever means connected to said pin means and mounted on said cover member for predetermined pivotal movement effecting simultaneous lifting of said pin means and release of said cover member in a first uppermost position and lowering of said pin means and securement of said cover member in a second lowermost operating position,
   said connection between said lever and pin means comprising upwardly concave spring means secured to said pin and having its end portions distorted to slidable engagement with said lever means to effect a force tending to maintain said lever means in its lowermost position.

2. In a pressure relief closure device according to claim 1 wherein:
   a portion of said lower lever means engages a substantial portion of said spring means when moved to its uppermost position,
   said spring means acting as a bearing surface for said lever means.

3. In a pressure relief closure device according to claim 1 wherein:
   wear plate guide member having upturned lateral portions centrally mounted on said cover member,
   said lever means being mounted within said wear plate guide member lateral portions, said lateral portions defining the plane of pivotal movement of said lever means.

4. In a combined closure and valve means,
   a cover member adapted for releasably engaging and closing a pressure outlet line,
   pin means adapted to be connected to valve means and extending through said cover member,
   lever means connected to said pin means and mounted on said cover member for predetermined pivotal movement effecting simultaneous uplifting of said pin means and release of said cover member in a first uppermost position and a lowering of said pin means and securement of said cover member in a second lowermost operating position,
   said connection between said lever and pin means comprising upwardly concave spring means centrally mounted to said pin means and distorted to a predetermined arcuate shape having its imaginary center point above said pin means,
   said arcuate shape spring means cooperating with a corresponding portion of said lever means for guiding the pivotal movement of said lever means about said spring means imaginary center point.

5. In a combined closure and valve means according to claim 4 wherein:
   wear plate guide means are centrally mounted on said cover member having uplifted lateral portions within which said lever means is mounted,
   said wear plate guide member lateral portions defining the plane of pivotal movement of said lever means.

6. In a combined closure and valve means,
   a cover member adapted for releasably engaging and closing a pressure outlet line, wear plate guide means centrally mounted on said cover member and having uplifted lateral portions,
   pin means adapted to be connected to valve means and extending through said cover member,
   lever means connected to said pin means and mounted on said uplifted lateral portions for predetermined pivotal movement effecting simultaneous uplifting of said pin means and release of said cover member in a first uppermost position and a lowering of said pin means and securement of said cover member in a second lowermost operating position, said wear plate guide means lateral portions defining the plane of pivotal movement of said lever means, and the limit of said lever means predetermined pivotal movement being determined by engagement of said wear plate guide means and the upper edge of said lever means cam surface, said connection between said lever means and said pin means comprising leaf spring means centrally mounted to said pin means and distorted to a predetermined arcuate shape having its imaginary centerpoint above said pin means, said arcuate shape spring means cooperating with a corresponding portion of said lever means for guiding the pivotal movement of said lever means about said spring means imaginary centerpoint.

7. In a combined closure and valve means according to claim 6 wherein:
said predetermined pivotal movement of said lever means is approximately 40° relative its lower operating position.

8. In a pressure relief closure device,
a pressure outlet pipe connected to a container at one end and open at its other end having an internal valve seat intermediate its opposite ends, and a pressure release port between said open end and said seat, said outlet pipe having a rim portion extending about its open end and having cam means disposed thereon, a cover member for closing said pipe open end having flange means adapted to releasably engage said rim portion cam means, said cover member and rim portions each having corresponding slots adjacent their periphery, a valve member within said pipe adapted to sealingly engage said valve seat, spring means for normally biasing said valve member into engagement with said seat, wear plate guide means centrally mounted upon said cover member having lateral uplifted portions, lever means externally mounted on said cover member within said wear plate guide lateral portions, said lever means having a cam surface adjacent its one end for engagement with said wear plate guide means and projecting tab means at its other end, a pin member extending through central openings in said cover member wear plate guide means and lever means arcuate portion and connected at one end to said main valve, spring retainer means connected to the other end of said pin member adjacent said lever means and shaped to generally conform to a concave portion of said lever means, said lever member adapted for pivotal movement between lowermost operating and uppermost pressure relief positions about the area of engagement of its cam surface and said wear plate guide means for effecting engagement between said lever means concave portions and said spring retainer means for selective lifting of said spring retainer means and its connected pin member and release of said valve member from sealing engagement with said valve seat.

9. The pressure relief closure device according to claim 8 wherein:
said wear plate guide means lateral uplifted portions define the plane of pivotable movement of said lever means and fix the alignment of said lever tab means and said cover member peripheral slot, and said lever tab means being receivable into said cover member and rim portion slots to prevent rotation of the cover member relative to said pipe rim for releasing said cover member when said lever is in its lowermost operating position.

10. In a pressure relief closure device according to claim 8 wherein:
the end portions of said spring retainer means engage the upper portions of the concave portion of said handle when said handle is proximate its lowermost operating position, said spring retainer means effecting a force tending to maintain said handle in its lowermost position.

11. In a pressure relief closure device according to claim 8 wherein:
a seal member is provided between a flange on the lowermost portion of said pin member and the underside of said cover member, said seal member being preloaded and biasing said lever means through said pin member and spring retainer means to its lowermost operating position.

12. In a pressure relief closure device according to claim 10 wherein:
the spring retainer means biasing force effects a movement of the lever means from a position near its lowermost operating position to its lowermost operating position when said closure member is rotated in the closing direction.

13. In a pressure relief closure device according to claim 8 in which:
stop means are provided on said pressure outlet pipe to cooperatively engage said cover member flange means to align said cover member and rim portion slots upon predetermined rotational closing of said cover member.

14. In a pressure relief closure device according to claim 8 in which:
the spring retainer means conforms to the shape of said depressed arcuate portion of said lever means during movement of said lever means to its uppermost pressure relief position, said spring retainer means acting as a bearing surface for said lever means.

15. In a pressure relief closure device according to claim 8 wherein:
engagement between said lever means one end and said wear plate guide means limits pivotal movement of said lever means other end to a predetermined elevation relative said cover member.

References Cited

UNITED STATES PATENTS

| | | | |
|---|---|---|---|
| 3,062,400 | 11/1962 | Humbert | 220—44 |
| 3,074,588 | 1/1963 | Burdue | 220—44 |

JAMES B. MARBERT, *Primary Examiner.*